March 13, 1934. E. B. WILFORD 1,950,424
AIRCRAFT
Filed Aug. 30, 1930 2 Sheets-Sheet 1
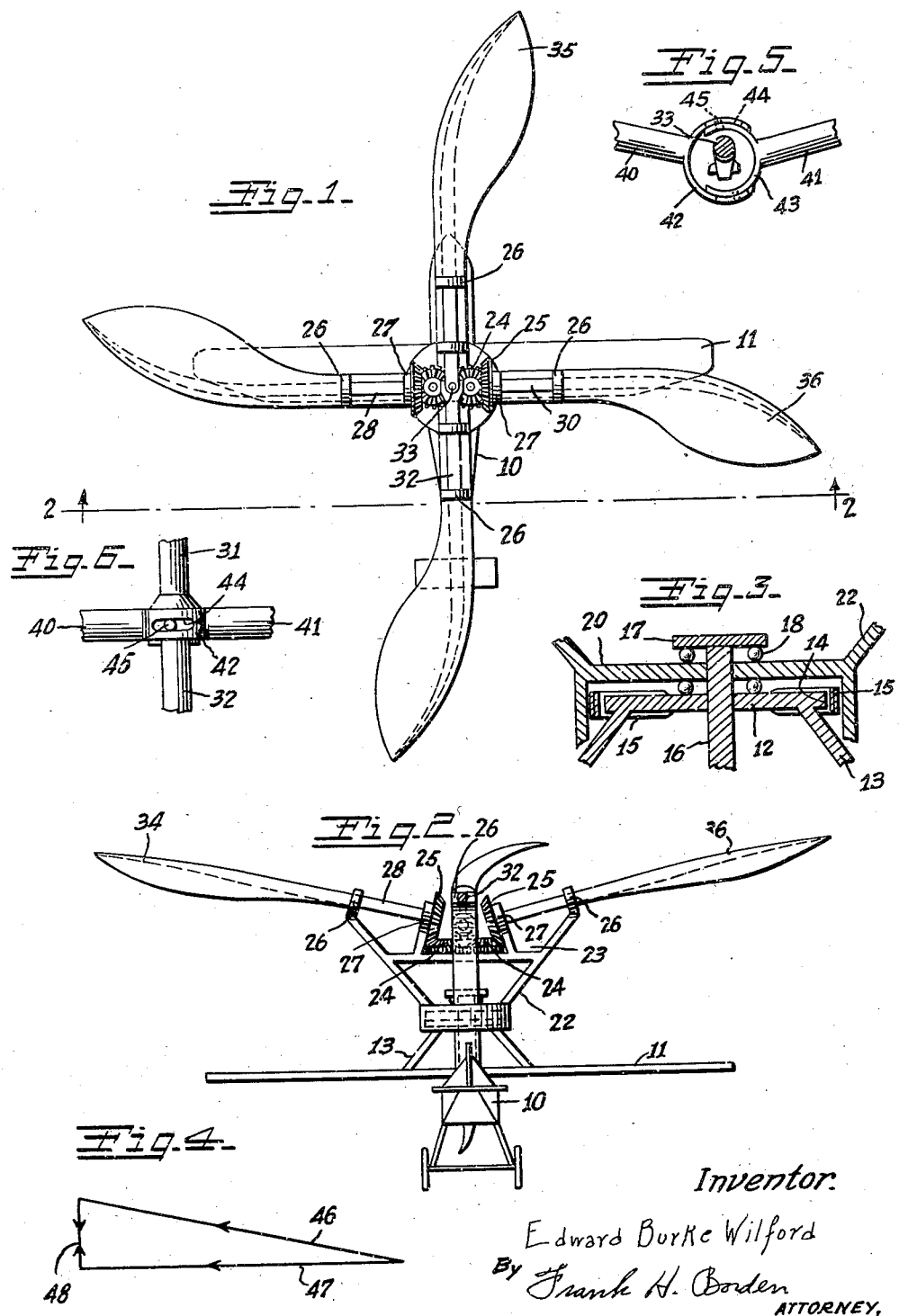
Inventor:
Edward Burke Wilford
By Frank H. Borden
ATTORNEY.

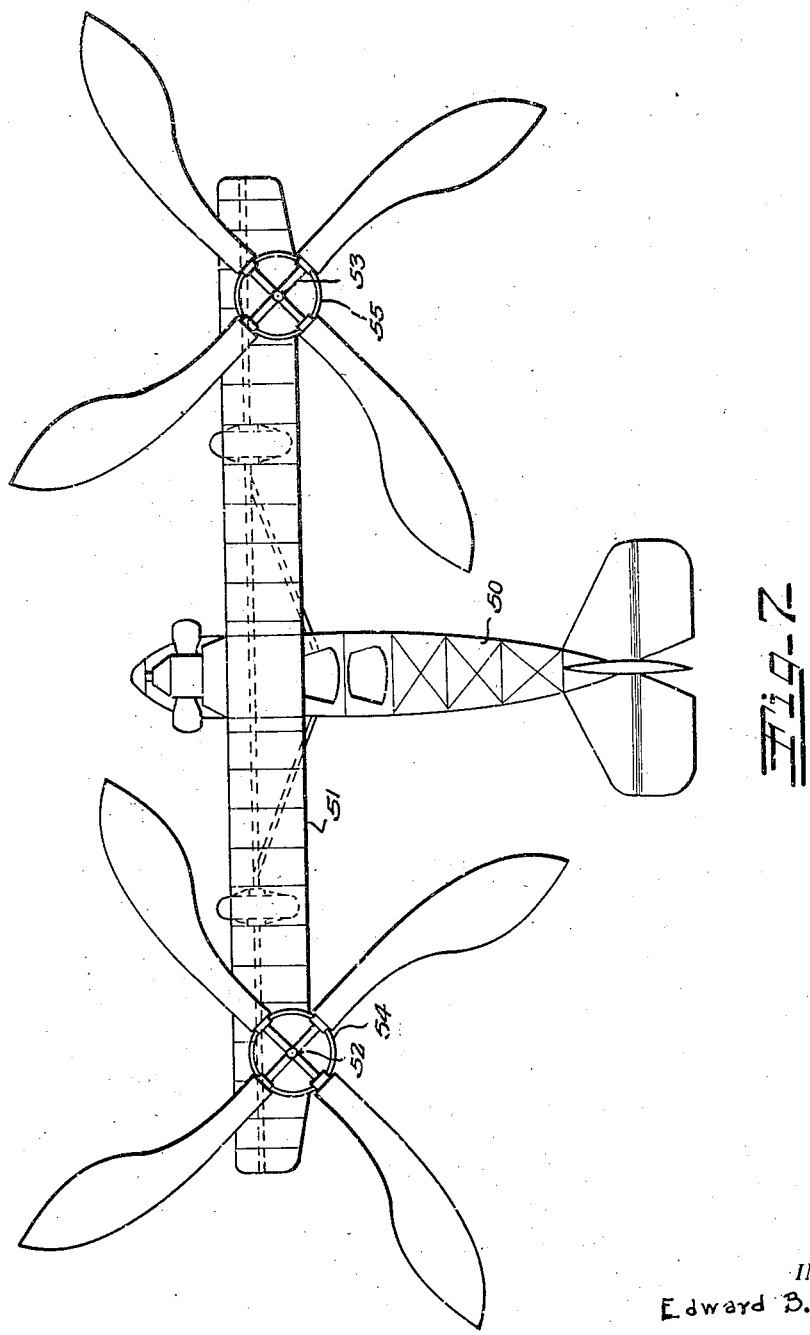

Patented Mar. 13, 1934

1,950,424

UNITED STATES PATENT OFFICE 1,950,424

AIRCRAFT

Edward Burke Wilford, Merion Station, Pa.

Application August 30, 1930, Serial No. 478,890

8 Claims. (Cl. 244—19)

This invention relates to aircraft and more particularly to rotatable sustaining elements for aircraft.

In Patent No. 1,777,678, granted October 7, 1930, to Rieseler and Kreiser, there was disclosed a rotatable sustaining "gyroplane" element which had several features of novelty and advanced utility over previous attempts at the solution of the problem. The application noted, disclosed a shaft journaled for free oscillation with airfoils or bearing planes mounted on opposite ends of the shaft but with the axis of the shaft extending longitudinally of the respective airfoils out of registry with the center of pressure thereof. The unit thus provided was arranged to oscillate under aerodynamic action to keep the resultant lift of each airfoil of the pair in balance. It has been discovered that with the construction disclosed in the application, it was necessary to make the shaft and other supporting elements quite heavy and rigid in order to provide sufficient strength to absorb the lifting bending moments imposed on the shaft from the respective airfoils without destruction, strain or breakage. Moreover, with an airfoil of ordinary construction mounted on the spar or shaft, the center of pressure of each airfoil could not be disposed far enough away from the axis of oscillation to provide sufficient leverage as to overcome, with sufficient rapidity under all conditions, the inertia of the shaft, and of the blades attached to it so as to be able to eliminate all rolling moments in the system without providing an airfoil of such appreciable span or chord as to be unwieldy and inefficient.

It is among the objects of this invention to improve the construction disclosed in the Rieseler and Kreiser patent above identified; to improve generally the art of aircraft; to provide a rotatable sustaining element to which power may be applied to secure vertical lift of an airplane but which is also available as a rotatable sustaining element of the gyroplane type if disconnected from the power source; to provide a rotatable sustaining element for airplanes of great strength but of appreciably lighter construction than previous practices; to provide in rotatable sustaining elements of the Rieseler and Kreiser type a plurality of shafts so arranged that upward bending moments on each shaft are absorbed or counteracted by downward bending moments incident to centrifugal force; to provide brake means for gyroplanes and like rotatable elements; to improve the efficiency of gyroplanes; to provide stabilizing means for aircraft of the gyroplane type through control of the respective lift of a plurality of rotatable sustaining elements, and many other objects and advantages as will become more apparent as the description proceeds.

In carrying out the invention in a preferred though purely illustrative form, a pair of airfoils are provided, each rigidly mounted upon a shaft mounted in bearings so that the shaft is at a slight angle to the horizontal, with the shafts coupled for driving relation one with the other. This assembly provides for shafts of light construction inasmuch as upward bending moments due to lift are counteracted by the downward bending moments due to centrifugal forces generated by rotation of the whole about a substantially vertical axis. As a further feature of the invention, each airfoil is of "sweep-back" construction with its major area being offset from the axis of oscillation in a curved tapered construction wherein the distance between the center of pressure and the axis of rotation, above identified, is appreciably increased with an increase in the aerodynamic efficiency of each airfoil owing to the disposition of the greater area thereof in a position where the peripheral speed of the airfoil is greatest.

In the accompanying drawings:

Fig. 1 represents a top plan of the improved sustaining support of this invention, Fig. 2 represents a front elevation thereof partially in section, Fig. 3 represents a fragmentary vertical section through the support of the unit, Fig. 4 represents a diagrammatic illustration of the forces acting on the shafts, Fig. 5 represents a fragmentary section through a modified form of universal connection of the shafts, Fig. 6 represents a fragmentary plan of the modified form of universal connection of the shafts disclosed in Fig. 5, and Fig. 7 represents a plan of an item of aircraft of the gyroplane type, having a plurality of rotatable sustaining elements with individual brakes on the respective elements to secure lateral stability of the aircraft.

In the preferred embodiment of the invention there are two pairs of blades, each blade of airfoil cross section, preferably, are arranged to traverse the same path of rotation. In the disclosures of Figs. 1 and 2 one pair of blades is shown as connected at the center through gearing, while the intersecting transversely disposed pair of blades are shown as having a universal connection, but it will be understood that any desired pivotal relation may be used as, for instance, the concentric universal joints disclosed in Figs. 5 and 6 to be later described.

The fuselage 10 of any desired construction may carry a short supplemental transversely extending wing 11 upon which lateral control surfaces (not shown) may be mounted. Rising vertically of the fuselage is a stationary turn-table 12 laterally braced as by struts 13 and, preferably, including a short cylindrical portion 14 upon which brake shoes 15 are mounted. The brake shoes may be of any form and operated in any desired manner by the pilot of the aircraft as will be clear. The use of brakes for stabilizing purposes will be described later. A vertical post 16 may be mounted axially of and through the turn-table 12, the lower end of which may be firmly secured to the fuselage and the upper end of which may terminate in an annular flange 17. It is preferred that the under side of flange 17 and the upper portion of turn-table 12 form race-ways for the reception of anti-friction or roller elements, such as 18, arranged to rotatably mount the support for the blades to be described. Obviously the bearing area will be proportioned to the load and to the stresses and strains incident to the use of the invention, and the disclosure in Figs. 2 and 3 is not limitative but purely illustrative.

The lower end of the rotatable support may comprise an annular plate 20 having a depending annular flange 21 arranged to rotate in juxtaposition to the brake shoes 13 and the plate being apertured to receive the post 16 and to be supported in vertical spaced relation between the flange 17 and turn-table 12, as by means of the anti-friction bearings 18. Extending radially and upwardly from the outer edges of the plate 20 are the arms 22 bridged horizontally by cross pieces 23. The cross pieces 23 in addition to strengthening the unit form supports for a pair of meshed horizontally disposed pinion gears 24, the upper portions of which comprise bevelled gears arranged to mesh with bevelled gears 25 carried by the respective oppositely disposed shafts to be described. The arms 22 and cross pieces 23 carry the journals or bearings 26 and 27, respectively, the axes of each pair of which being slightly angularly divergent from the horizontal so that shafts 28 and 30 mounted in the bearings are also inclined to the horizontal. The respective bevelled gears 25 are rigidly mounted on the ends of the respective shafts so that oscillation of one shaft in its bearings causes an equal and synchronous and similar oscillation of the opposite shaft. In the other pairs of journals 26, 27, the axes of which lie in a vertical plane perpendicular, preferably, to the axis of shafts 28 and 30, shafts 31 and 32 are mounted with their axes also angularly divergent from the horizontal and joined together by a universal connection 33.

Each shaft carries a blade of substantially airfoil cross section rigidly mounted upon the shafts as at 34, 35, 36 and 37. It is to be observed that the blades or airfoils are so disposed as to sweep rearwardly of the axis with the trailing edge and the side edge of each airfoil merging or meeting in a point of intersection well behind the axis of their respective shafts so that the axis of each blade passes longitudinally through each blade for a limited distance when it emerges through the entering edge of the airfoil. By thus providing not only that the greater area of each airfoil is behind the axis of oscillation thereof, but also that the major area is disposed in the path of rotation in which the peripheral speed is greatest, there is a combined effect of an increase in the efficiency of the respective blades as well as the locating of the center of pressure of each blade well behind the axis of the blade so that the lever arm from center of pressure to axis is increased in length with an appreciable increase in the responsiveness of the blades to variations in lift to equalize their resultant lift. In addition to the stabilizing effect attained by the dihedral of the respective pairs of blades particularly in lateral displacement from an even keel, or in lateral motion such as side-slipping, which is of importance, the invention attains appreciable savings in the weight of the structural elements used by so proportioning parts that the bending moments incident to the lift and which are generated between the outer bearings 26 and the tip of the blades, are substantially absorbed by downward bending moments resulting as components of centrifugal force. The relation of upward bending moment and downward bending moment is substantially maintained no matter what the peripheral speed of the sustaining element may be, as each moment increases substantially in proportion to the speed of rotation of the unit. By thus damping out the bending moments I am enabled to use lighter shafts and supports than might otherwise be necessary.

The geared connection disclosed in Figs. 1 and 2 is purely illustrative of one form of connection that may be used to insure synchronous action of the coupled blades while insuring that the respective pairs of blades rotate in the same cone of rotation. As shown in Figs. 5 and 6, however, it is contemplated that the blades of one pair may have their shafts coupled by a substantially universal connection permitting the slight degree of oscillation necessary for the functioning of the device. Thus, shafts 31 and 32 are connected by their ordinary universal connection 33, as will be understood, while the transversely disposed shafts 40 and 41, will be provided with nesting semi-cylindrical yokes 42 and 43, the legs of which have respectively slots 44 and pins 45 to establish driving relation between the yokes, while permitting relative sliding motion of the yokes to adjust themselves for oscillations of the respective shafts, as will be understood.

In the diagrammatic disclosure of Fig. 4, line 46 represents the axis of the shaft carrying one blade of the rotor, line 47 represents the direction of the centrifugal force, while line 48 represents the lift of the blade, so that equilibrium is secured with the resultant force passing along the line of the shaft, so that the shaft is subjected only to tensile forces and is relieved of substantially all bending moments.

It will be understood that the single rotor is a potential menace to bystanders at an airport, as it would normally continue to rotate at a dangerous speed for an appreciable period after landing. The pilot may apply the brake and retard or stop the rotor at any time he so desires, as when about to land, or after contact has been made with the ground. The rotor of this invention is so strongly designed as to permit rapid acceleration or deceleration by the application of suitable means to the vertical axis thereof, in marked contrast to other types of rotors in which blades are transversely pivoted by hinges close to the vertical axis and which may not be able to withstand the shearing strains imposed on the hinges by the application of such means to the vertical axis.

In the form of invention shown in Fig. 7, a fuselage 50, of any desired form, may carry a suitably trussed and reinforced wing 51, upon the outer ends of which rotatable sustaining elements or rotors 52 and 53 are journalled for rotation. These elements may be of any desired construction, although it is preferred to use such a rotor as is disclosed in Figs. 1 and 2, or in the Rieseler and Kreiser application previously identified.

Each rotor is provided with a brake, respectively 54 and 55, each arranged in any desired manner, as to a control device such as a control stick or the like in the fuselage (not shown) for either independent or simultaneous actuation by the pilot.

The aircraft being in flight, and a situation arising requiring a lateral stabilizing action, the pilot applies the brake on the high side, which instantly decelerates that rotor, (53), thus slightly reducing its effective lift, with a resultant differential lift sufficient as with the end of the wing carrying rotor 52 lowering to restore the lateral stability of the aircraft. Obviously the brake on the rotor so actuated will be released quickly to prevent the generation of an undesired rolling moment. When landing both brakes are actuated simultaneously if quick stop of the rotors is desired.

It will be apparent that although in the interests of simplicity there has been disclosed but a pair of rotors, in lateral alignment, a greater number of rotors may be used and if they are suitably distributed on the aircraft both longitudinal and lateral stability may be accomplished through suitable manipulation of the brakes on the respective rotors.

It is thought that the advantages occurring from the invention will be obvious.

I claim as my invention:

1. In aircraft, a rotatable sustaining element including angularly divergent shafts mounted for free oscillation, airfoils mounted on the respective shafts with the center of pressure of each airfoil lying behind the axis of its respective shaft, and means for supporting the shafts and airfoils for bodily rotation about an axis, the shafts describing a flattened cone so that upward bending moments exerted by the airfoils are substantially counteracted by downward bending moment components of centrifugal force generated by rotation of the sustaining element as a whole.

2. In airplanes, a rotatable sustaining unit including a pair of oppositely disposed airfoils, a spar supporting each airfoil with the center of pressure of the airfoil lying behind the axis of oscillation of said shaft, and each airfoil comprising a curved wing surface, the tip end of which is clear of the axis of said shaft.

3. In aircraft, a rotatable sustaining element, comprised of two pairs of blades, a shaft supporting each blade and each journalled for support in a plane angularly divergent from the horizontal, means connecting opposite shafts of a pair through a pivotal connection such that all of the shafts lie in the same cone of rotation.

4. In aircraft, a rotatable sustaining element including angularly divergent shafts mounted inflexibly for free oscillation, airfoils mounted on the respective shafts with the center of pressure of each airfoil lying behind the axis of its respective shaft, and means for supporting the shafts and airfoils for bodily rotation about an axis, the shafts describing a flattened cone so that upward bending moments exerted by the airfoils are substantially counteracted by downward bending moment components of centrifugal force generated by rotation of the sustaining element as a whole, with a dihedral angle between opposing blades providing stabilizing effects.

5. In gyroplanes, a rotatable sustaining unit including a pair of oppositely disposed airfoils, a shaft supporting each airfoil with the center of pressure of the airfoil lying behind the axis of oscillation of said shaft, and a swept-back plan form of the airfoil such that the distance from the center of pressure of an airfoil to the axis of oscillation of its shaft increases from the root toward the tip of the blade, to provide a lever arm of such length as to overcome the inertia of the oscillating system.

6. In gyroplanes, a rotatable sustaining element comprised of a pair of blades, a shaft supporting each blade and each journalled for support in a plane angularly divergent from the horizontal, means connecting the shafts through a driving connection such that both shafts lie in the same cone of rotation and so that the blades oscillate together.

7. In gyroplanes, a rotatable sustaining element comprised of means rotatable about a substantially vertical axis, a pair of blades, a shaft supporting each blade and each journalled for oscillation in the first mentioned means with the axes of the shafts non-coincidental and angularly divergent, means connecting the shafts through a driving connection such that the blades oscillate together in the same direction.

8. In gyroplanes, a rotating wing system comprising means defining an axis of rotation of the system, a shaft journalled on said means and having an axis intersecting and lying in a plane extending substantially radially of said rotative axis, a blade mounted on said shaft and so disposed that a line drawn from the center of one end of the blade to the center of the other end of the blade is rearwardly acutely angularly divergent from the axis of said shaft.

EDWARD BURKE WILFORD.